Jan. 12, 1954 M. A. KENT 2,665,602
TIRE CHAIN APPLYING CLAMP
Filed Dec. 6, 1949

INVENTOR.
Moss A. Kent
BY
John J. Hanrahan
ATTORNEY

Patented Jan. 12, 1954

2,665,602

UNITED STATES PATENT OFFICE 2,665,602

TIRE CHAIN APPLYING CLAMP

Moss A. Kent, White Plains, N. Y.

Application December 6, 1949, Serial No. 131,388

1 Claim. (Cl. 81—15.8)

This invention relates to new and useful improvements in tools or devices for use by motorists and has particular relation to a tool for use in applying anti-skid chains to the tires of motor vehicles.

An object of the invention is to provide a tool for the purpose specified and which is adapted to be placed on the tire of a wheel and have the ends of the side chains of an anti-skid chain attached thereto to draw the anti-skid chain over and around such tire on the wheel being rotated one revolution, the tool comprising a single length of spring stock bent up and including a connecting portion of considerable length and a pair of side arms extending from the ends of the same side of said cross bar and inclining toward one another as they leave the cross bar and then being curved outwardly away from one another and on their inner convex opposing faces being each provided with a row of burs whereby the tool is adapted to be sprung or forced open with its side arms spaced greater than normal to be passed over a tire with one side arm at each side of the tire and its connecting portion over the tread of the tire and to attempt to close as said arms try to spring back to their normal relation whereby to have at least one bur on the curved portion of each arm bite into a side wall of the tire to secure the tool in place.

Another object is to provide a tool of the character and of the construction and for the purpose specified and wherein each outwardly curved portion of the side arms of the tool is notched through one edge for the reception of a bar of a link of a side chain of an anti-skid chain for the purpose of temporarily attaching an anti-skid chain to the tool when such chain is to be drawn about or over a tire.

From the foregoing it will be seen that it is a general object of the invention to provide a tool for the purpose specified and which tool is of simple and inexpensive construction yet easy to use and which is adapted for repeated use.

Other objects and advantages of the invention will become apparent from a consideration of the following detailed description taken in connection with the accompanying drawing wherein satisfactory embodiments of the invention are shown. However, it is to be understood that the invention is not limited to the details disclosed but includes all such variations and modifications as fall within the spirit of the invention and the scope of the appended claim.

Figure 1:
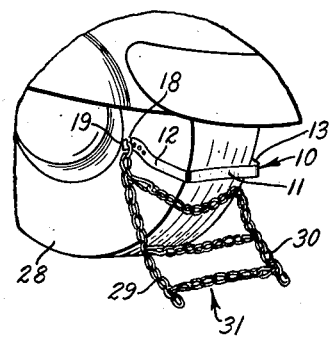
Fig. 1 is an isometric view illustrating the manner of use of the present tool.

Referring in detail to the drawing and at first more particularly to Figs. 1–8, the tool of the invention is generally designated 10 and the same comprises a body formed of a single length of metal and specifically a single length of spring metal, such as tempered carbon steel in flat strip form. The tool or body comprises a flat elongated connecting portion 11 of a length greater than the width of the tread of a large size passenger car tire casing and at each end of this connecting portion 11 the stock is bent upwardly providing side arms 12 and 13 inclining toward one another in their inner portions or their portions toward the ends of the connecting portion 11.

Thereafter, on or toward their outer ends, the side arms 12 and 13 are bent to extend inwardly as at 14 and 15 and then are curved or bowed longitudinally whereby toward their free ends they comprise longitudinally curved portions 16 and 17 having their convex surfaces facing one another or in opposed relation. These opposed convex faces define opposite sides of a throat which, as will later appear, is enlarged as the side arms 12 and 13 are spread apart to permit of the tool being applied to a tire casing. Clearly, the space between the curved arm portions 16 and 17 of the body is very materially less than the length of the connecting portion 11.

Each arm, toward its free end, has a portion cut therefrom providing a notch 18 entering through the upper edge of the arm whereby a hook-like portion 19 is formed at the extreme outer end of each arm. Additionally, the arms in their curved portions 16 and 17 have rows of burs 20, 21 and 22, and 23, 24 and 25, respectively, projecting from their opposing faces. These burs are preferably made with a square punch whereby holes 26 are formed through the curved arm portions and the metal displaced in providing these openings with the square punch provides the indicated burs, each of which (see specifically Figs. 4 and 5) comprise four barbs 27, such barbs extending inwardly and defining the edges of the openings 26. Each barb is substantially pointed at its free inner end and thus the burs are adapted for digging into any material softer than themselves.

The tool may be used for applying anti-skid chains to various sizes of tires and in any instance the tool is first applied as suggested in Fig. 1. For this purpose, it is necessary to grasp its arms, preferably the hook-like portions 19 of the arms are grasped, and the arms are pulled or sprung apart enlarging the above-mentioned throat between portions 16 and 17 whereby the tool may be disposed on the tire casing, as for example, the tire casing 28 in Fig. 1 with the arms of the tool against the side walls of the tire casing and the connecting portion 11 of the tool across the tread of the tire casing. The tool is positioned with the openings or notches 18 facing upwardly and then the end links of the side chains 29 and 30 of an anti-skid chain 31 have portions disposed in said notches whereby said side chains of the anti-skid chain are temporarily attached to the tool by the hook-like portions 19 of the latter.

This process is repeated on the two corresponding tires of the vehicle, as for example, the two rear tires, and then the vehicle is moved ahead one revolution of said rear tires so as to carry the anti-skid chain about the tire as from the position of Fig. 1 over the upper side of the tire and down underneath the same to bring the end links of the side chains 29 and 30 back approximately to the starting position of Fig. 1 when the side chains of the anti-skid chain are connected in any or the usual manner. Before such connection is made, the side chains are unhooked from the tool and the latter removed from the tire casing.

Figure 7:
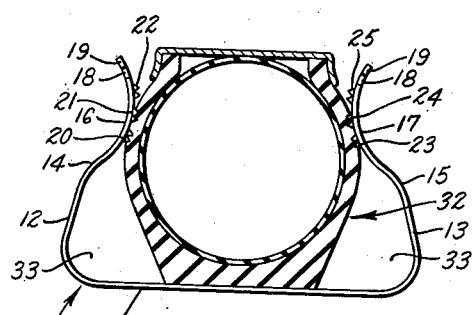
Fig. 7 is a view showing the application of the tool to a small size of tire casing, the latter being on a rim and in transverse section.
Figure 6:
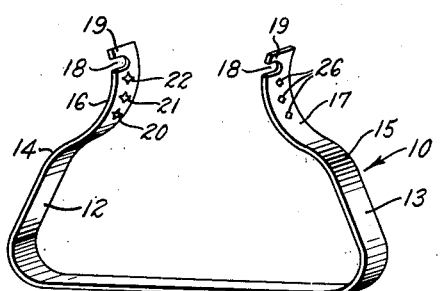
Fig. 6 is an isometric view of the tool alone.

The present tool is constructed in the particular manner described whereby it is of inexpensive construction and may be easily and readily used for its designed purpose and is adapted for use with various sizes of tire casings and is further adapted for repeated use. When applying the tool to a small tire casing, as for example a 5½" or 6" casing generally designated 32, the tool is applied somewhat in the manner illustrated in Fig. 7. There it will be seen that of the two rows of burs on the tool arm portions 16 and 17, the two inner burs of each row are digging into the side walls of the tire casing. That is because the arms of the tool are spread apart in the application of the tool to the casing and the size of the latter prevents the arms returning to their normal positions as in Fig. 2 so that the spring or resilience of the arms is urging them toward one another and is urging the burs into the side walls of the casing. On the smaller casing, in the application of the tool, the connecting portion 11 of the latter is sprung or distorted little, if at all. Fig. 7 is illustrative of conditions occurring in portions of the tire casing other than the bottom portion or the portion on which the casing is resting.

With the present disclosed construction, when the vehicle wheel is rotated so that the connecting portion 11 of the tool is at the underside of the wheel and there is a considerable weight on the portion of the casing between the arms of the tool, such tire casing portion may flatten on its underside and spread laterally as there is considerable room in the space 33 of Fig. 7 for this expansion. Thus, the tool will remain in place and will drag the anti-skid chain under the wheel, this being the critical point in the mounting of the chains on the tire casings by the use of the present tool, and without jacking up the vehicle.

Figure 8:
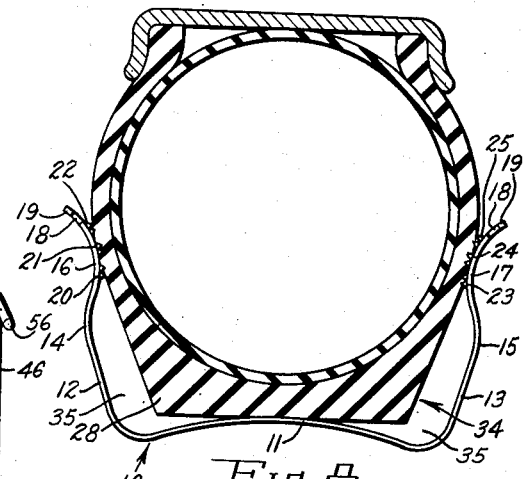
Fig. 8 is a view similar to Fig. 7 but illustrating the application of the tool to a larger size of tire casing.

When the tool is used on a large size tire, as for example an 8" or an 8½" tire, the position of the tool when applied is substantially as illustrated in Fig. 8. There will be some little differences, depending on the particular make of tire casing or the amount of wear the same has suffered. However, on these large casings, such as is generally indicated 34 in the mentioned Fig. 8, the tool must be very materially sprung to pass its arms to the sides of the casing. In fact, the arms are sprung to substantially the extent illustrated in Fig. 8 and this results in an inward bowing of the connecting portion 11 of the tool so that it is the convex surface of the portion 11 which engages the tread of the tire casing 34.

Then the arms of the tool do not reach so far along the casing side walls but their curved portions become so located that the burs 20–25, or at least some of such burs, dig into the side walls of the casing. As the arms are spread out and engage the outwardly inclined portions of the side walls of the casings, the middle burs 21 and 24 of each row dig into the casing or attempt to dig into the casing and also the outer burs 22 and 25 of the respective rows are brought against the side walls of the casing and the inner burs 20 and 23 sometimes engage. With this construction, as the wheel carrying the tire is revolved and carries the tool to the bottom side of the tire, the weight then impressed on the tool flattens the bowed connecting portion 11 and as the tire spreads laterally under the weight there is a further thrust to spread the arms of the tool and all of the burs of each row dig into the side walls of the casing so that at this critical point, that is, the passing of the tool under the wheel, the tool is more firmly than ever engaged with the casing and will stay in place and drag the anti-skid chain under the wheel as desired.

Figure 2:
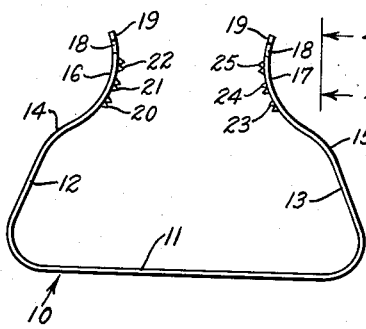
Fig. 2 is a front elevational view of the tool of the invention in normal condition.
Figure 3:
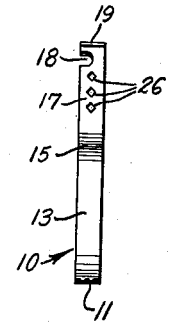
Fig. 3 is an edge elevational view thereof.
Figure 4:
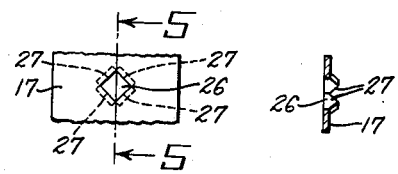
Fig. 4 is an enlarged detail elevational view of a small section of one of the curved portions of a side arm of the tool, the view being taken as suggested by the line 4—4 of Fig. 2.
Figure 5:
Fig. 5 is a detail sectional view taken as along the line 5—5 of Fig. 4.

With respect to Fig. 8, it will be noted that even in the very large sized passenger car tire there is yet a space 35 between each side arm of the tool and the side of the tire casing into which the latter may spread when the tool is under the wheel and the latter has the weight of the vehicle thereon. In this connection, an inspection of Figs. 7 and 8 will show that from the smaller to the larger sizes of tire casings there is always a space between the inner portions of the side arms and the side walls of the tire casing into which the latter may spread without spreading against the inner portions of the side arms or the portions where the side arms join the connecting portion 11 of the tool. Thus, spreading of the tire casings at the times indicated will not result in any permanent deformation of the tool and when the latter has been used and has been removed from the casing it returns to, because it is made of spring stock, approximately its normal condition, as illustrated in Fig. 2.

The formation of the burs by the use of a square punch provides each bur with the series of barbs 27 for digging into the side walls of the tire casings in various planes and the burs of this construction are obtained at a minimum of expense. Further, since the hook-like portions 19 are provided by removing portions of the stock to provide the notches 18, it will be seen that the whole tool is of inexpensive manufacture. Due to the curvature of the portions 16 and 17 of the side arms of the tool, the hook-like portions 19 of the latter are always disposed laterally of the side walls of the tire casing so that the end links of the side chains of an anti-skid chain may be readily applied to and removed from said hook-like portions.

With the present construction of tool, it is also pointed out that the same need not be applied in a perfectly symmetrical manner. If it is applied in any unsymmetrical manner or slightly askew, the burs will still be positioned to dig into the side walls of the tire casing although at slightly different levels on the respective sides of such casing. Thus, if the tool in Fig. 8 is visualized as mounted askew with its arm 12 higher than its arm 13, the outer burs 24 and 25 of the latter will surely engage in the side wall of the casing although the tendency will be to move the bur 23 away from the casing. Conversely, with respect to the burs 20–22, this positioning of the tool in an unsymmetrical manner would definitely bring the bur 20 against the side wall of the tire casing and the latter would be engaged by the bur 21 but the tendency would be for the bur 22 to be spaced from the casing.

From all of the above it will be seen that the tool of the invention is of relatively inexpensive manufacture and that it is adapted for use in applying anti-skid chains to various sizes of tire casings without the necessity of jacking up the vehicle, the wheels of which mount such casings. Further, it will be seen that each arm of the tool includes a curved portion, which curved portions have their convex sides in opposing relation and that there are a row of burs on each curved portion projected from its convex side whereby as the tool is mounted on different sizes of casings, various of the burs of the different rows are positioned to dig into and grip or fasten the tool to the side walls of the tire casing.

Figure 9:
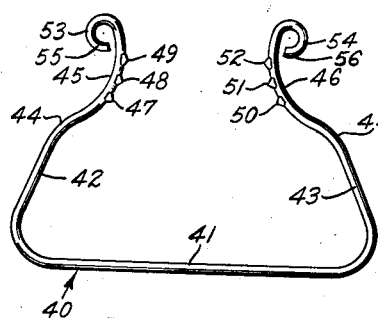
Fig. 9 is a front elevational view of the tool as made from round stock.
Figure 10:
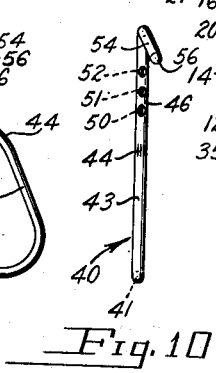
Fig. 10 is an edge elevational view of the tool of Fig. 9.

Referring now to Figs. 9 and 10, the tool there generally designated 40 is shown as made up of a length of transversely round spring stock, or of a length of wire. Tool 40 comprises the relatively long connecting portion 41 and the arms 42 and 43 corresponding with the connecting portion 11 and arms 12 and 13 of the tool 10. Arms 42 and 43 are bent up from the ends of the connecting portion 41 and in their inner portions incline toward one another and lie in the plane with the connecting portion 41. Then the arms are bent inwardly as at 44 and beyond this bend are longitudinally curved as at 45 and 46, respectively. On the convex or inner surfaces, the curved arm portions 45 and 46 are provided with burs 47, 48, 49, 50, 51, and 52, respectively.

These burs correspond with the burs on the tool first described but the burs 47–52 are made up by swaging or pinching the metal at spaced points along the convex sides of the curves 45 and 46 so each bur in the tool 40 has but one point. Beyond the curved portions 45 and 46, the arm portions 53 and 54 of the respective arms are curved or bent outwardly and back upon themselves providing hook-like portions 55 and 56. These hook-like portions are also slightly offset laterally, as is best seen in Fig. 10. The amount of this offset is held to a minimum whereby the tool 40 is relatively flat and is, as much as possible, all in one plane for a purpose to be described.

This tool is used substantially in the manner of the tool 10 and is placed on a tire casing with its hook-like portions 55 and 56 inclining slightly upwardly. These hook-like portions are to have the end links of the side chains of an anti-skid chain hooked onto them for temporarily attaching the anti-skid chain to the tool whereby the former may be drawn up and over a tire casing. The purpose of the slight lateral or upward offset of these hook-like portions, which offsets are best illustrated in Fig. 10, is to prevent the end links of the side chains of an anti-skid chain sliding off the hooks or just simply falling off the hooks under their own weight.

The tool of Figs. 9 and 10 will be used in the manner described in connection with the tool of the other figures of the drawing and is applicable to different sizes of tire casings and in its application to different sizes of tire casings different ones of its rows of burs will come into play. That is, on smaller tire casings, most of the engagement will be between the inner burs of each row and on larger tire casings the outer burs of the rows will do most of the work of anchoring the tool to the tire casing.

In addition, the tool 40 is made flat whereby it may be slipped through rim openings usually provided for emergency links or snatch chains in some wheel rims. Usually such openings are merely slots adapted to have a strap pass through them. However, the tool 40 may be worked through such slots and in such instance its arms will extend outwardly along the side walls of the tire casing so that the hook-like portions 55 and 56 of the tool will be at opposite sides of the tire only slightly inwardly of the tread thereof.

Having thus set forth the nature of my invention, what I claim is:

An anti-skid chain applying tool comprising a single length of spring stock bent into a generally U-shape and including a transverse connecting portion for engaging the tire tread and side arms extending upwardly from the respective ends of said connecting portion, each of said side arms including a lower tire side clearance portion, which in the normal untensioned condition of said tool extends at an inward angle from said transverse portion, and an upper tire side engaging portion arcuately curved along its length with its convex face inwardly disposed whereby when said side arms are forced outwardly to varying degrees through engagement of said tool with tires of varying sizes the crest points at which said arcuate tire side engaging portions engage the tire sides vary longitudinally along said tire side engaging portions, said arcuate portions each having at its free terminal end a chain connecting hook means, which in the engaged position of said tool on a tire is spaced outwardly from the tire side by the outward curving of said arcuate portion above the tire engaging crest point, and said arcuate portions each having in longitudinally spaced relation a plurality of inwardly directed sharp pointed tire side embedding prongs whereby at least one of said prongs is in an optimum location to substantially coincide with a crest point in engagement with a tire side and has substantially maximum tire side penetration under pressure of the tensioned side arm as the latter is spread outwardly by the tire engaged by said tool.

MOSS A. KENT.

References Cited in the file of this patent

UNITED STATES PATENTS

| Number | Name | Date |
|---|---|---|
| 1,416,758 | Silverman | May 23, 1922 |
| 1,426,268 | Flugel | Aug. 15, 1922 |
| 2,100,819 | Salley | Nov. 30, 1937 |
| 2,166,869 | Lees et al. | July 18, 1939 |
| 2,175,395 | Hewel | Oct. 10, 1939 |
| 2,207,286 | Cohen | July 9, 1940 |
| 2,213,910 | Higgins et al. | Sept. 3, 1940 |
| 2,299,185 | Smola | Oct. 20, 1942 |
| 2,445,947 | Hoppes | July 27, 1948 |

FOREIGN PATENTS

| Number | Country | Date |
|---|---|---|
| 175,502 | Switzerland | May 1, 1935 |